United States Patent [19]
Umeya

[11] Patent Number: 6,028,581
[45] Date of Patent: Feb. 22, 2000

[54] METHOD AND APPARATUS FOR A LIQUID CRYSTAL DISPLAY (LCD) HAVING AN INPUT FUNCTION

[75] Inventor: Shinjiro Umeya, San Diego, Calif.

[73] Assignees: Sony Corporation, Tokyo, Japan; Sony Electronics, Inc., Park Ridge, N.J.

[21] Appl. No.: 08/955,388

[22] Filed: Oct. 21, 1997

[51] Int. Cl.⁷ ............................... G09G 3/36; G09G 5/00
[52] U.S. Cl. .......................... 345/104; 345/175; 349/95
[58] Field of Search ................................. 345/104, 102, 345/92, 87, 84; 349/42, 43, 46, 50, 62, 63, 96, 95, 84, 57

[56] References Cited

U.S. PATENT DOCUMENTS

| | | | |
|---|---|---|---|
| 5,430,462 | 7/1995 | Katagiri et al. | 345/104 |
| 5,550,659 | 8/1996 | Fujieda et al. | 345/104 |
| 5,610,629 | 3/1997 | Baur | 345/104 |
| 5,771,039 | 7/1998 | Ditzik | 345/104 |

*Primary Examiner*—Bipin Shalwala
*Assistant Examiner*—David L. Lewis
*Attorney, Agent, or Firm*—Blakely, Sokoloff, Taylor & Zafman LLP

[57] ABSTRACT

A method and an appartus for a liquid crystal display (LCD) having an input function are provided. A first transistor is provided in each of the pixel cells of a pixel cell array of a LCD. This first transistor, or display transistor, is a thin film transistor (TFT) switch that is coupled to a transparent electrode that controls the display of pixels on the LCD. Moreover, a second transistor is provided in each of the pixel cells of the pixel cell array. This second transistor is a TFT switch that forms part of a metal-oxide semiconductor (MOS) image sensor array including a photo diode and a micro lens. The second transistor causes an input to be sensed by the LCD. The inputs sensed by the LCD include image inputs and inputs from a pen and a human touch. The first and second transistors are fabricated on the same side of the same substrate.

31 Claims, 7 Drawing Sheets

FIG. 2 *(PRIOR ART)*

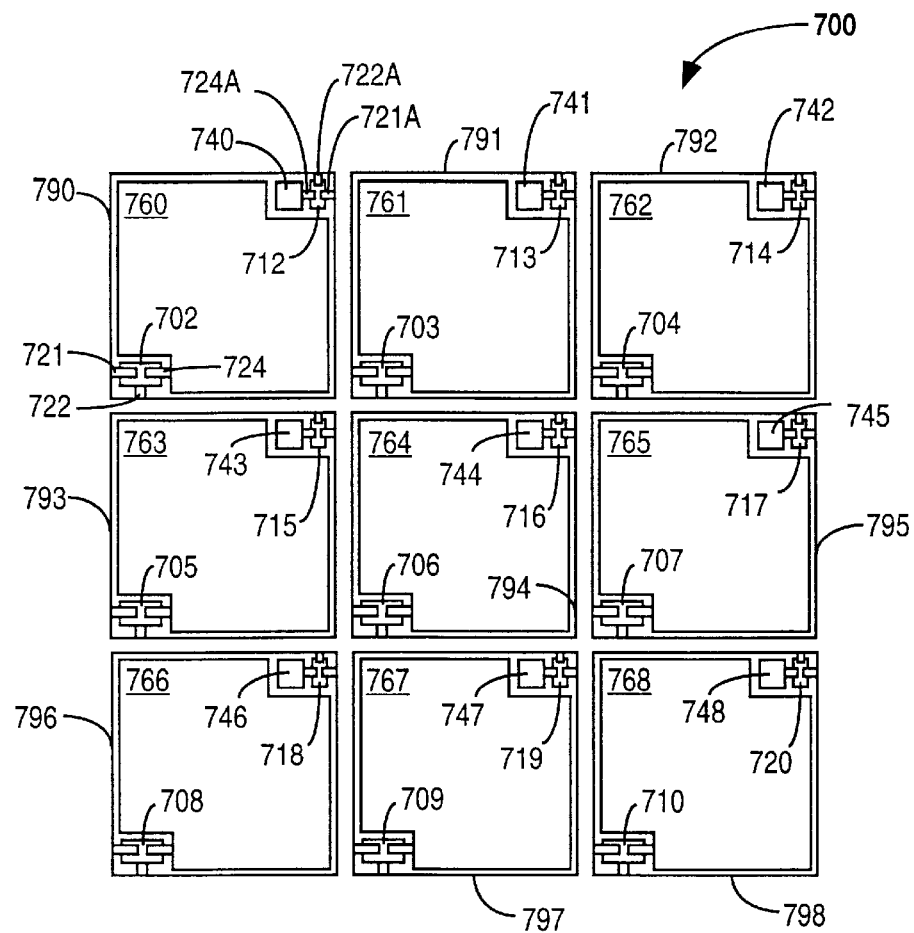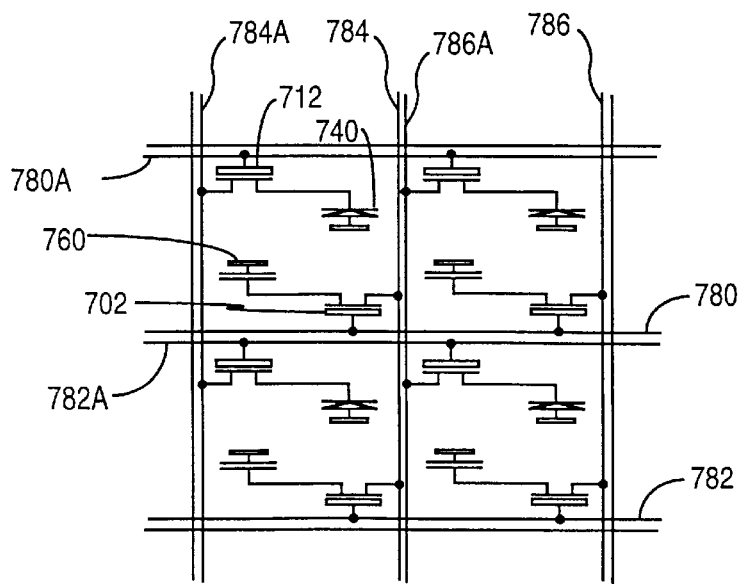
FIG. 7

METHOD AND APPARATUS FOR A LIQUID CRYSTAL DISPLAY (LCD) HAVING AN INPUT FUNCTION

FIELD OF THE INVENTION

This invention relates to liquid crystal displays (LCDs). More particularly, this invention relates to a LCD used as a flat panel screen display having an input function fabricated on the display glass substrate.

BACKGROUND OF THE INVENTION

Flat panel screen displays are designed to display information and images on a screen. They have been extensively used in conjunction with computer systems as computer display screens. Instead of using the large and heavy cathode ray tube technology, many flat panel displays utilize Liquid Crystal Display (LCD) technology. The flat panel LCDs are relatively light weight and have low power consumption. Therefore, the flat panel LCD screen is ideal for use with portable computers where light weight and low power consumption are desired.

However, conventional flat panel LCDs have several problems steming form their structural design. For instance, images formed on the screen within a prior art LCD must be viewed straight on by the computer user by facing the screen directly, otherwise known as a 90 degree view angle. When viewing the flat panel screen tilted or from a vertical or horizontal angle, called "off-axis" viewing, prior art LCD screens may create display distortions because of the optical nature of the display technology. Most often this off-axis viewing leads to contrast degradation and color aberrations.

The display distortions inherent in the prior art LCD are called parallax and are a consequence of off-axis viewing. Parallax is defined as the difference between the observable position of an image on the LCD and the surface of the LCD screen resulting when the angle of view is such that the apparent image is not visibly oriented directly under the corresponding point on the surface of the display. Parallax increases with an increase in the off-axis viewing angle.

FIG. 1 illustrates the parallax problem in a prior art embodiment. The illustration shows a target pixel 112 in an LCD layer 105 and the corresponding target point 114 on the surface of the touch screen or top glass 103. The view location 101 is at an angle to the normal of the display, and so the intersection of the line of sight 102, between the observer location and the target pixel, and the top glass is a point some distance from the target point. The distance between the line of sight/top glass intersection 110 and the target point 114 is the parallax 120 associated with the particular display and particular viewing angle. The parallax is zero for an observer viewing the target pixel head-on such that the line of sight is normal, or perpendicular, to the display surface.

Parallax is a particularly acute problem with touch sensitive screens where the user of the system provides inputs to the system by pointing to, or touching, objects displayed on the screen because the construction of flat panel LCDs causes the image to appear at a position that is not the true tangible screen surface position. The difference in depth between the image position and the surface of the flat panel display is called the image depth. Large image depth contributes to the problem of parallax because the larger the image depth the worse the parallax. In a typical prior art design, the image depth is enlarged when touch sensitive flat panel touch screens are employed because a special thick touch sensitive layer rests on top of the outer layer of the LCD. This touch sensitive layer presents a layer between the displayed image and the viewer through which the viewer must view the display.

As a result of the image depth created by the touch sensitive layer, when the flat panel touch sensitive screen is viewed off-axis the optical position of the image is different from the tangible position on the screen surface. Thus, the apparent position of the pixel is not the same as the position on the surface of the screen vertically correspondent with the electrode grid below responsible for creating the apparent image. This is true because the screen tilt and image depth causes the image to appear in a screen location which is not directly above the image and thus difficult to touch when using thick touch sensitive screens, and is therefore difficult to target when the display is used in a touch sensitive configuration. This is a problem because when such a display is used as a touch screen, the user touches the surface of the display with the expectation that the surface coordinates correlate to the coordinates of the pixels visible within the display. Therefore, if a touch sensitive screen is used with this type of LCD then it is difficult, if not impossible, to accurately select various on-screen items because of the parallax problem.

One answer to this problem is to make the layers through which the image must pass sufficiently thin to reduce the image depth and the parallax.

However, structural support is required to protect the fragile LCD layer because mechanical pressure on an LCD layer can modify the alignment of the molecules of the structure comprising the LCD and can even permanently damage the LCD structure. Furthermore, the thinner the film the more easily it is scratched. Moreover, very thin films frequently peel or separate from the surface of the LCD. Therefore, a sufficient thickness is required for the touch sensitive layer.

Computer systems are often used in video conferencing applications. In the typical prior art video conferencing setup using a computer system, conference participants view a personal computer screen which is displaying the participants at the other end of the conference connection. The images of the conference participants on each end of the connection are captured by a prior art camera mounted on top of or on the side of the video display. As the participants are watching each other on the display and the camera is viewing them from an off-axis angle, eye-to-eye contact is difficult. Consequently there is a requirement for a LCD display having an input function integrated with the pixel display cells where the input function senses image inputs and pen and human touch inputs, and where the input function does not require a separate substrate from that of the LCD.

SUMMARY OF THE INVENTION

A method and an appartus for a liquid crystal display (LCD) having an input function are provided. According to one aspect of the invention, a first transistor is provided in each of the pixel cells of a pixel cell array of a LCD. This first transistor, or display transistor, is a thin film transistor (TFT) switch that is coupled to a transparent electrode that controls the display of pixels on the LCD. Moreover, a second transistor is provided in each of the pixel cells of the pixel cell array. This second transistor is a TFT switch that forms part of a metal-oxide semiconductor (MOS) image sensor array including a photo diode and a micro lens. The second transistor causes an input to be sensed by the LCD. The inputs sensed by the LCD include image inputs and inputs from a pen and a human touch. The first and second transistors are fabricated on the same side of the same substrate. A first set of source control lines and a first set of gate control lines are provided to the first transistor, and a second set of source control lines and a second set of gate control lines are provided to the second transistor.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 7 is a cell array of the LCD of one embodiment.

DETAILED DESCRIPTION

A method and an apparatus for a liquid crystal display having an input function are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
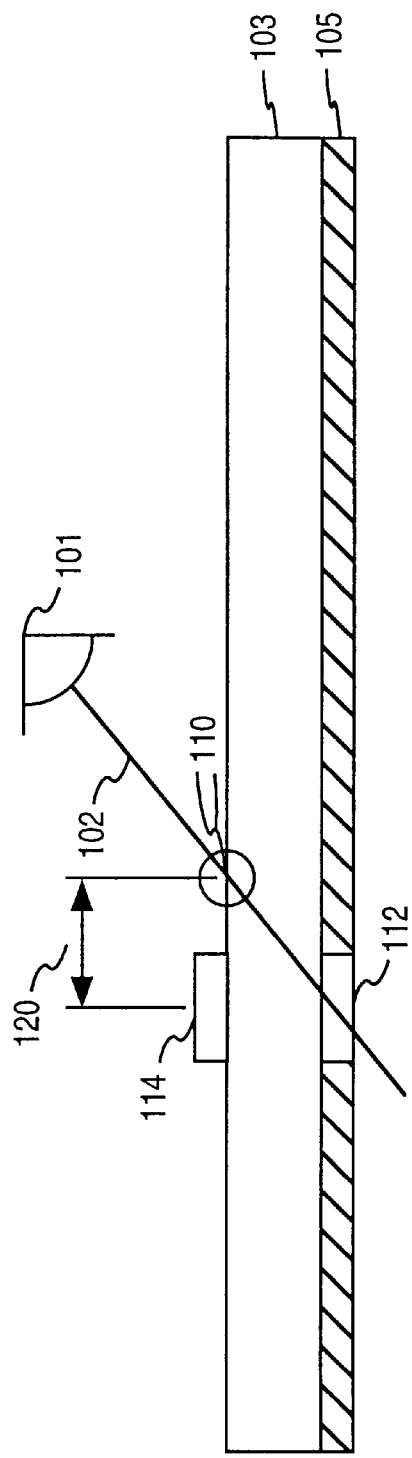
FIG. 1 illustrates the parallax problem in a prior art embodiment.
Figure 2:
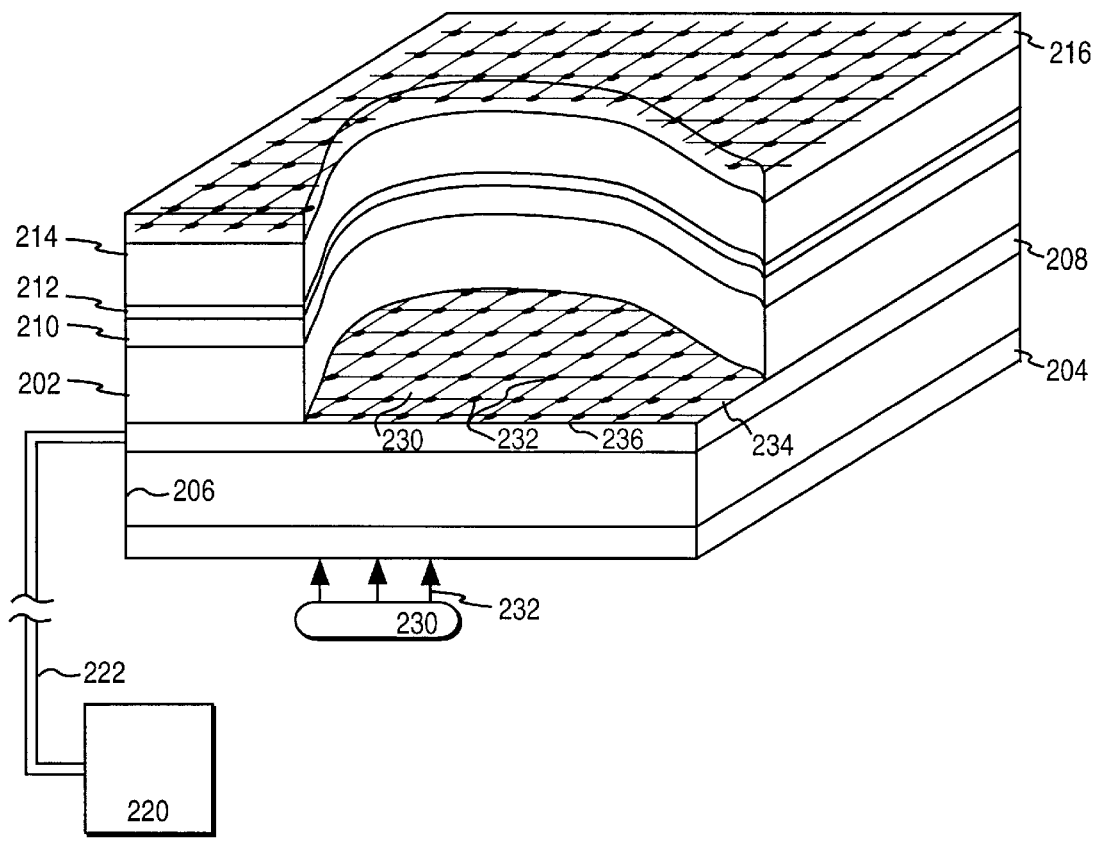
FIG. 2 is a cross sectional view of a prior art touch sensitive thin film transistor (TFT) active matrix LCD display structure.

FIG. 2 is a cross sectional view of a prior art touch sensitive thin film transistor (TFT) active matrix LCD display structure. The display structure is multilayered and forms the screen upon which images are viewed. Image formation occurs within a liquid crystal (LC) layer 202. However, the image is a result of an optical interaction between several layers 202–216 including the LC layer 202. A computer system 220, or other control unit, interfaces with the LC screen through electronic connections 222 to control the creation of images and data thereon. A portion of the structure of the LCD screen has been removed so that certain layers are exposed for description.

In the operation of an LCD display, a light source 230 emits light radiation 232 from behind the screen plane to substantially irradiate the entire screen back plane, or the back plane may be irradiated by reflecting light incident on the display from the viewer's environment or some combination, reflective lighting and light source, thereof. The light rays traverse through several layers 204–206 which typically serve to polarize and filter the light as well as providing mechanical support for the LCD structure. The light rays then traverse through an active transistor and output electrode matrix layer 208 and the LC layer 202 which provides the control and structure required to form images. The transistors of the active transistor layer may be TFTs.

The images created by this LCD are composed of pixels. Each pixel is associated with at least one corresponding transistor and corresponding electrode from the control layer 208, wherein each transistor is responsible for creating a viewable pixel on the viewing screen. A number of localized active transistors, or a matrix of transistors, may thus create an image. Each transistor has an opaque electrode. The transistors are shown in the cut away cross section of layer 208 and are illustrated by the dark dots 232 at each intersection line. The lines represent the control lines for the transistors; the source lines are illustrated by lines 236 running vertically and the gate lines are illustrated by lines 234 running horizontally. To activate a particular transistor 232, its identifying gate lines 234 and source lines 236 are activated.

Each transistor 232 controls a corresponding output electrode 230 associated with it and attached to the transistor drain via a common electrode 210. Not all of the output electrodes are shown for simplification; only a few electrodes 230 are shown and shaded, however, it is appreciated that each transistor has its own output electrode. The output electrodes are insulated from the common electrode 210 by the high dielectric properties of the LC layer 202; they therefore act as capacitors. The output electrodes 230 are also transparent and will charge up upon transistor activation to create an electric field. A holding capacitor, not shown, may be fabricated along with the TFT to maintain this charged state longer than the capacitance of the output electrode alone. The output electrodes 230 are conductors while maintaining their transparent properties. If the computer 220, or control unit, identifies a particular transistor 232 and activates such, the corresponding output electrode is thereby charged and creates a localized charge between the electrode plate 230 and the common electrode 210. This charge will affect the liquid crystal layer 202 because application of an electric potential between the TFT and the common ground creates an electric field in a particular direction. In this manner, the display character of pixels is controlled by each transistor.

Figure 3:
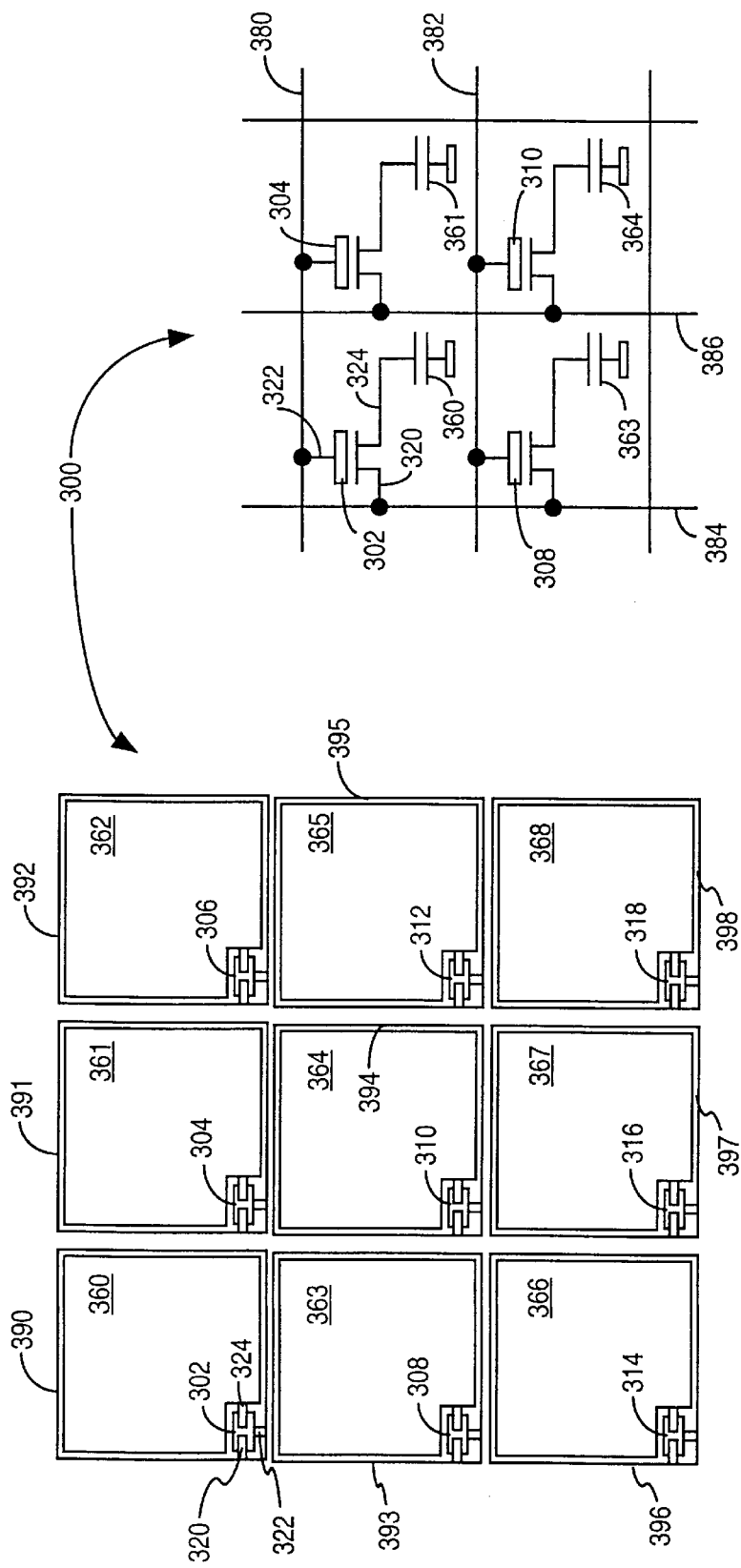
FIG. 3 is a prior art TFT display array.

FIG. 3 is a prior art TFT display array 300. In this array 300, a number of transistors 302–318 form a matrix 300, or display array, and the matrix 300 is used to create an image comprised of pixels as previously discussed. Each pixel cell 390–398 produces one pixel of the image using one corresponding transistor 302–318, respectively. Each transistor is coupled to a set of control lines 380–386. The control lines comprise source lines 384 and 386 and gate lines 380 and 382. The source lines 384 and 386 are coupled to the sources of transistors 302–318 using an electrode similar to electrode 320, but are not so limited. The gate lines 380 and 382 are coupled to the gates of transistors 302–318 using an electrode similar to electrode 322, but are not so limited. To activate a particular transistor, its identifying gate lines and source lines are activated. The drain of each transistor 302–318 is coupled to an opaque electrode using an electrode similar to electrode 324, wherein the transistor 302–318 acts as a switch to control the opaque electrode 360–368, respectively. The charge applied to the opaque electrode 360–368 controls the electric field within the pixel cell thereby controlling the display character of the corresponding pixel. The opaque electrode 360–368 may be connected to either the drain or the source of the transistor 302–318, respectively, depending on where the voltage source is connected to the transistor 302–318.

With reference to FIG. 2, the electric field is generated by the charge interaction of the various output electrodes 230 and the common electrode layer 210 which surrounds the LC layer 202. The common electrode is continuous and generally connected to the ground. The common electrode layer 210 creates a reference voltage for use with each of the independent output electrodes 230 so that an electric field may be produced there between. The output electrode 230 is charged positively or negatively or in an alternating manner with respect to the plane of the common electrode layer 210. When a positive charge settles on one of the output electrodes 230, it will set up a localized electric field through a localized portion of the LC layer 202 to align a portion of the LC crystals in the layer that are bounded by the area of the charged electrode 230 and the common electrode layer 210. This field will align the liquid crystal molecules in a first arrangement. When the potential between the TFT and the common electrode 210 is brought to zero the LC crystals will return to a second arrangement. It can be appreciated that liquid crystal molecules can be selected and placed in the proper environment wherein they arrange themselves in a first formation upon application of an electric field and arrange themselves in a second formation when no field is present. In this fashion, light passing through the LC layer having liquid crystal molecues in the first formation will be seen by the viewer as a white pixel on the display. Light passing through the LC layer having liquid crystal molecules in the second formation will not be seen by the viewer and will therefore represent a black pixel on the display.

Figure 4:
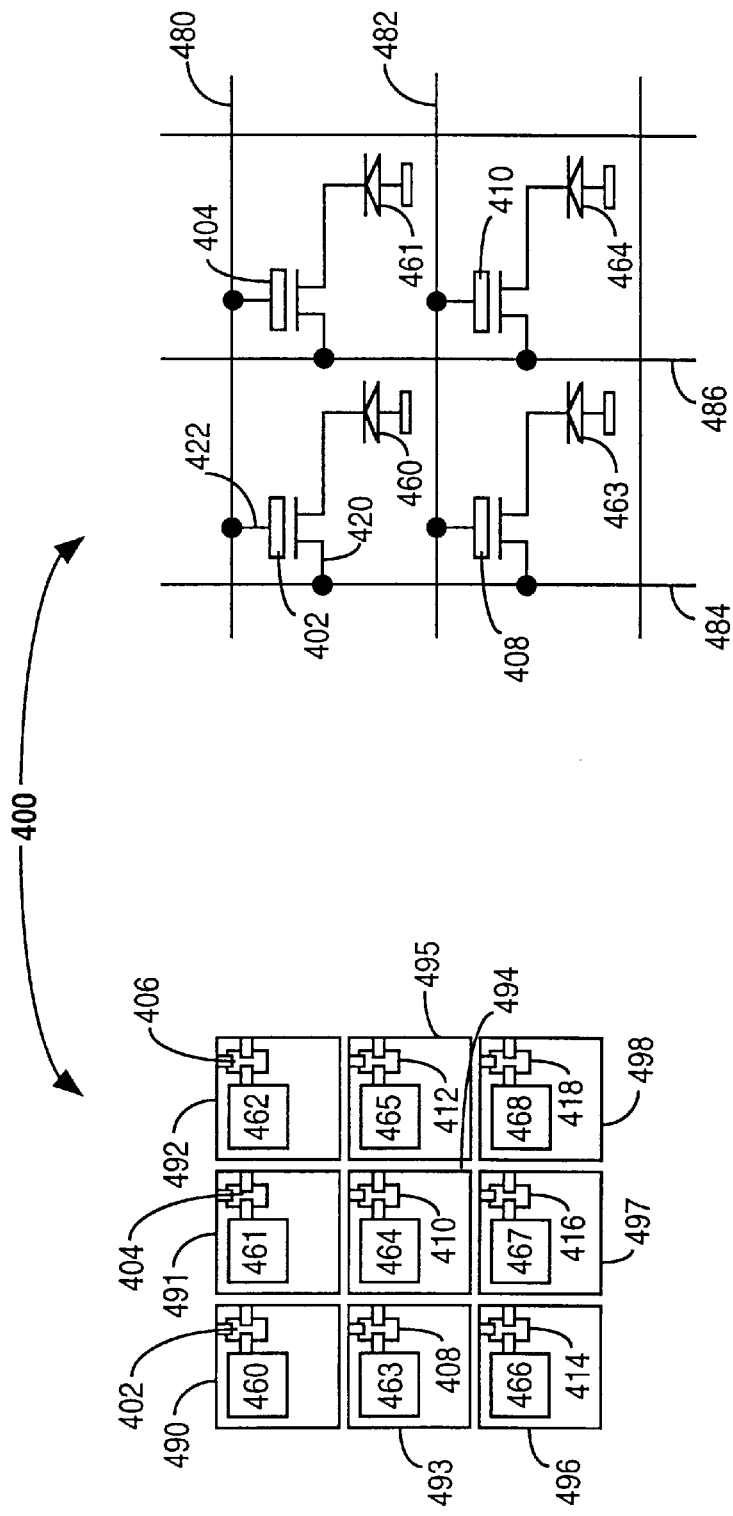
FIG. 4 is a prior art input sensor array.

Located between the viewer and the common electrode layer 210, other layers 210–216 may be used to provide additional filtering or mechanical support to the LCD. On a touch sensitive screen, these additional layers include a layer 216 comprising the input sensor array. FIG. 4 is a prior art input sensor array 400. In this array 400, a number of transistors 402–418 form a matrix 400, or input sensor array, and the matrix 400 is used to sense an input to the LCD. Each sensor cell 490–498 produces an input signal using one corresponding transistor 402–418, respectively. Each transistor is coupled to a set of control lines 480–486. The control lines comprise source lines 484 and 486 and gate lines 480 and 482. The source lines 484 and 486 are coupled to the sources of transistors 402–418 using an electrode similar to electrode 420, but are not so limited. The gate lines 480 and 482 are coupled to the gates of transistors 402–418 using an electrode similar to electrode 422, but are not so limited. To activate a particular transistor, its identifying gate lines and source lines are activated. The drain of each transistor 402–418 is coupled to a photo diode using an electrode similar to electrode 424, wherein the transistor 402–418 acts as a switch to control the signal from the photo diode 460–468, respectively. The photo diode 460–468 is connected to either the drain or the source of the transistor 402–418, respectively, depending on where the voltage source is connected to the transistor 402–418.

Figure 5:
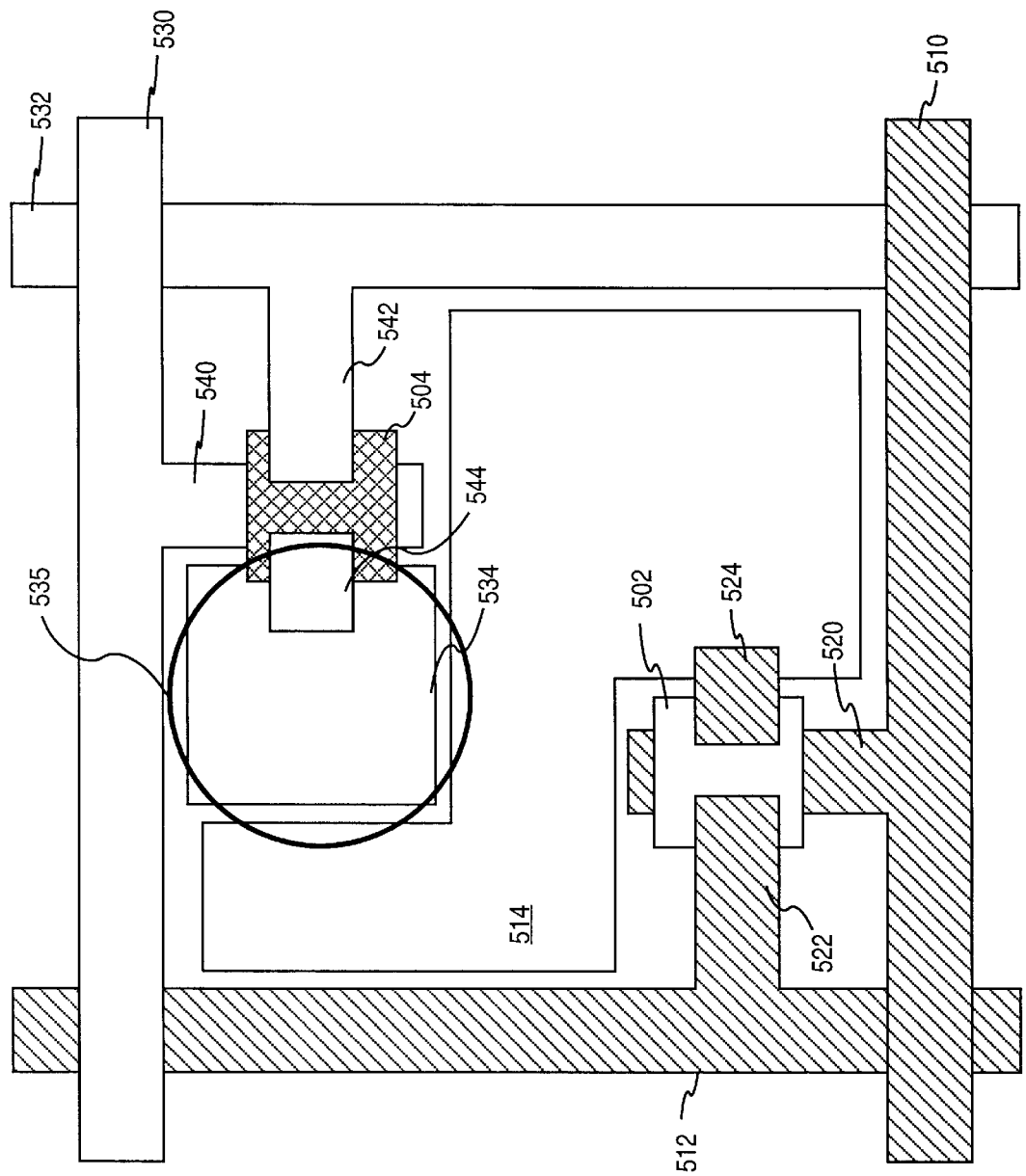
FIG. 5 is a pixel cell of the LCD of one embodiment.
Figure 6:
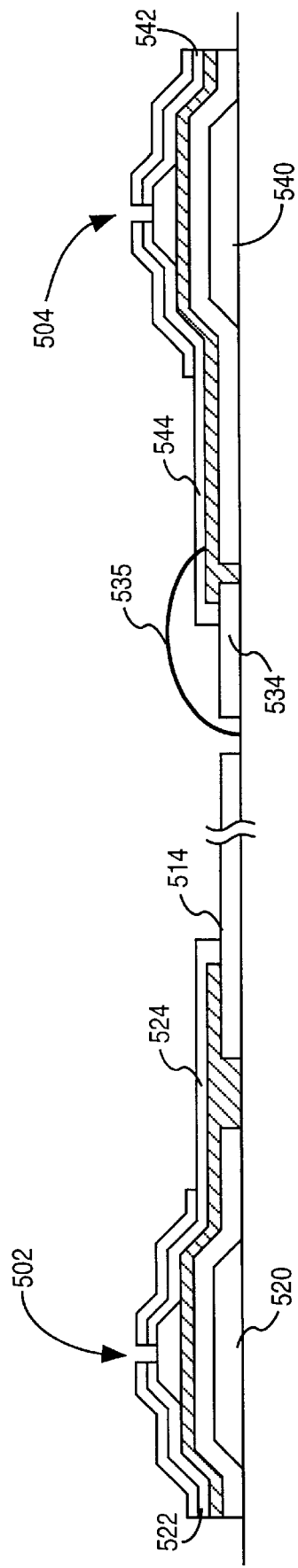
FIG. 6 is a cross-section view of the pixel cell of one embodiment showing display and input sensor transistors on the same substrate.

FIG. 5 is a pixel cell 500 of the LCD of one embodiment. This pixel cell combines the display array circuitry and the sensor array circuitry, as previously separately discussed, into the same cell thereby eliminating the need for an additional layer of the LCD to provide the input sensor function. Pixel cell 500, in one embodiment, comprises two thin film transistors (TFTs) 502 and 504 fabricated on the same substrate. FIG. 6 is a cross-section view of the pixel cell 500 of one embodiment showing transistors 502 and 504 on the same substrate. The transistors 502 and 504 may be fabricated on the same side of the same substrate, but are not so limited. Alternatively, the transistors 502 and 504 may be fabricated on opposite sides of the same substrate. In one embodiment, transistors 502 and 504 are fabricated on the opposite corners of a pixel cell to reduce interference and complicity of design, but the design is not so limited. The transistors 502 and 504 are activated using particular gate and source lines wherein each transistor 502 and 504 is coupled to receive control signals over a set of control lines 510–512 and 530–532, respectively.

Transistor 502 along with transparent electrode 514 comprise the display portion of pixel cell 500. Transistor 502 is coupled to gate control line 510 using electrode 520, and gate control line 510 controls the voltage applied to the gate of transistor 502. Transistor 502 is coupled to source control line 512 using electrode 522, and source control line 512 controls the source voltage to the source of transistor 502. The drain of transistor 502 is coupled to a tranparent, or opaque, electrode 514 using electrode 524. The transistor 502, as shown, comprises a portion of electrodes 520, 522, and 524 in the vicinity of the coupling of the transistor 502 and the electrodes 520, 522, and 524. Transistor 502 acts as a switch in controlling the application of voltage to electrode 514, and the application of voltage to electrode 514 is used to control the display of a pixel. The charge applied to the opaque electrode 514 controls the electric field within the pixel cell 500 thereby controlling the display character of the corresponding pixel as previously discussed. In an alternate embodiment, the source of transistor 502 may be coupled to the transparent electrode 514 and the drain of transistor 502 may be coupled to the source control line 512. Furthermore, electrodes 520, 522, and 524 are laminated in one embodiment.

Transistor 504 along with input sensor 534 and micro lens 535 comprise the input sensor portion of pixel cell 500. The input sensor of pixel cell 500 causes an input to be sensed by the liquid crystal display. The input sensor of pixel cell 500 is smaller than the display portion of pixel cell 500, in one embodiment, because the display portion needs a larger aperture ratio for image brightness. The inputs sensed by the LCD include an input from a pen and the touch of a human. The micro lens also allows the LCD to function as a camera by sensing an image input in front of the screen. This camera, while located directly in front of the viewer of the display screen, facilitates eye-to-eye contact in video conferencing applications by eliminating the off-axis viewing problem caused by having to place the camera above or to the side of the viewer.

Transistor 504 is coupled to gate control line 530 using electrode 540, and gate control line 530 controls the voltage applied to the gate of transistor 504. Transistor 504 is coupled to source control line 532 using electrode 542, and source control line 532 controls the source voltage to the source of transistor 504. The drain of transistor 504 is coupled to an input sensor 534 using electrode 544. The transistor 504, as shown, comprises a portion of electrodes 540, 542, and 544 in the vicinity of the coupling of the transistor 504 and the electrodes 540, 542, and 544. Transistor 504 acts as a switch in controlling the application of voltage to input sensor 534. In an alternate embodiment, the source of transistor 504 may be coupled to the input sensor 534 and the drain of transistor 504 may be coupled to the source control line 542. The input sensor 534 of one embodiment has a micro lens 535 fabricated over a photo diode or other sensor part 534. Electrodes 540, 542, and 544 are laminated in one embodiment.

FIG. 7 is a cell array 700 of the LCD of one embodiment. This cell array is comprised of a number of pixel cells 500 that combine the display array circuitry and the sensor array circuitry, as previously separately discussed, into the same cell thereby eliminating the need for an additional layer of the LCD to provide the input sensor function. The electrical composition of each pixel cell 500 comprising the cell array 700 is the same as previously discussed with reference to FIG. 5.

Pixel cell array 700 comprises a number of display transistors 702–710 that form a matrix 700, or display array, and the matrix 700 is used to create an image comprised of pixels as previously discussed. Each pixel cell 790–798 produces one pixel of the image using one corresponding display transistor 702–710, respectively. Each display transistor is coupled to a set of control lines 780–786. The control lines comprise source lines 784 and 786 and gate lines 780 and 782. The source lines 784 and 786 are coupled to the sources of transistors 702–710 using an electrode similar to electrode 721, but are not so limited. The gate lines 780 and 782 are coupled to the gates of transistors 702–710 using an electrode similar to electrode 722, but are not so limited. To activate a particular transistor, its identifying gate lines and source lines are activated. The drain of each transistor 702–710 is coupled to an opaque electrode 760–768, respectively, using an electrode similar to electrode 724, wherein the transistor 702–710 acts as a switch to control the opaque electrode 760–768, respectively. The charge applied to the opaque electrode 760–768 controls the electric field within the pixel cell thereby controlling the display character of the corresponding pixel as previously discussed.

Pixel array 700 also comprises a number of input sensor transistors 712–720 that comprise an input sensor array that is used to sense an input to the LCD. Each pixel cell 790–798 produces an input signal using one corresponding input sensor transistor 712–720, respectively. Each input sensor transistor is coupled to a set of control lines 780a–786a. The control lines comprise source lines 784a and 786a and gate lines 780a and 782a. The source lines 784a and 786a are coupled to the sources of input sensor transistors 712–720 using an electrode similar to electrode 721a, but are not so limited. The gate lines 780a and 782a are coupled to the gates of transistors 712–720 using an electrode similar to electrode 722a, but are not so limited. To activate a particular transistor, its identifying gate lines and source lines are activated. The drain of each transistor 712–720 is coupled to an input sensor 740–748, respectively, using an electrode similar to electrode 724a, wherein the transistor 712–720 acts as a switch to control the signal from the input sensor 740–748, respectively.

Thus, a method and an apparatus for a liquid crystal display having an input function have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for providing a liquid crystal display comprising an input function, the method comprising the steps of:
   providing a first transistor in each of at least one pixel cell of a pixel cell array, the first transistor causing a pixel to be displayed on the display;
   providing a second transistor in each of the at least one pixel cell, the second transistor causing an input to be sensed by the liquid crystal display;
   providing a sensor further comprising a photo sensor element and a micro lens, the sensor electrically coupled with the second transistor; and
   providing a first set of source control lines and a first set of gate control lines to the first transistor; and
   providing a second set of source control lines and a second set of gate control lines to the second transistor.

2. The method of claim 1, wherein the first and second transistors are thin film transistors (TFT).

3. The method of claim 2, wherein the first transistor is coupled to a transparent electrode.

4. The method of claim 1, further comprising the step of fabricating the first and the second transistor on the same substrate.

5. The method of claim 4, wherein the first and the second transistor are fabricated on the same side of the same substrate.

6. The method of claim 4, wherein the first and the second transistor are fabricated on opposite sides of the same substrate.

7. The method of claim 1, further comprising the step of the second transistor causing an input from a pen to be sensed by the liquid crystal display.

8. The method of claim 1, further comprising the step of the second transistor causing an image input to be sensed by the liquid crystal display.

9. A display for displaying images comprising at least one pixel, the display comprising:
   a first transistor in each of at least one pixel cell, the first transistor causing a pixel to be displayed on the display;
   a second transistor in each of the at least one pixel cell, the second transistor causing an input to be sensed by the liquid crystal display;
   a sensor further comprising a photo sensor element and a micro lens, the sensor electrically coupled with the second transistor; and
   a first set of source control lines and a first set of gate control lines are coupled to the first transistor, and a second set of source control lines and a second set of gate control lines are coupled to the second transistor.

10. The display of claim 9, wherein the first and second transistors are thin film transistors (TFT), wherein the first transistor is coupled to a transparent electrode, and wherein the second transistor is coupled to a photo sensor.

11. The display of claim 9, wherein the first and the second transistor are located on the same side of a substrate.

12. The display of claim 9, wherein the second transistor causes an input from a pen to be sensed by the liquid crystal display, and wherein the second transistor causes an image input to be sensed by the liquid crystal display.

13. A system for displaying images, the system comprising:
   a processor;
   a display coupled to the processor, the display comprising;
   a first transistor in each of at least one pixel cell of a pixel cell array, the first transistor causing a pixel to be displayed on the display,
   a second transistor in each of the at least one pixel cell, the second transistor causing an input to be sensed by the pixel cell;
   a sensor further comprising a photo sensor element and a micro lens, the sensor electrically coupled with the second transistor; and
   a first set of source control lines and a first set of gate control lines are coupled to the first transistor, and a second set of source control lines and a second set of gate control lines are coupled to the second transistor.

14. The system of claim 13, wherein the first and second transistors are thin film transistors (TFT), wherein the first transistor is coupled to a transparent electrode, and wherein the first and second transistors are fabricated on the same side of the same substrate.

15. The system of claim 13, wherein the first and second transistors are thin film transistors (TFT), wherein the first transistor is coupled to a transparent electrode, and wherein the first and second transistors are fabricated on opposite sides of the same substrate.

16. The system of claim 13, wherein the second transistor causes an input from a pen and an image to be sensed by the liquid crystal display.

17. The method of claim 1, further comprising the step of the second transistor causing an image to be sensed by the liquid crystal display.

18. A computer system comprising a liquid crystal display coupled to a processor, the display configured to:

display data and video images on a screen of the display and sense an image received through the screen utilizing a micro lens and photo sensor element while displaying the data and video images; the system further comprising:

a first transistor in each of at least one pixel cell of a pixel cell array of the display, the first transistor causing a pixel to be displayed on the display, and a second transistor in each of the at least one pixel cell, the second transistor causing an input to be sensed by the pixel cell;

a first set of source control lines and a first set of gate control lines are coupled to the first transistor, and a second set of source control lines and a second set of gate control lines are coupled to the second transistor.

19. The system of claim 18, wherein the system is used for video conferencing.

20. The system of claim 18, wherein the first and second transistors are thin film transistors (TFT), wherein the first transistor is coupled to a transparent electrode, and wherein the second transistor is coupled to a photo sensor, the photo sensor comprising a micro lens and a photo diode.

21. The system of claim 20, wherein the first and the second transistors are fabricated on the same side of the same substrate.

22. The system of claim 20, wherein the first and the second transistors are fabricated on opposite sides of the same substrate.

23. The system of claim 18, wherein the input comprises an input from a pen and an image from a lens.

24. A liquid crystal display (LCD) comprising:

a first means for causing a pixel to be displayed in a pixel cell of the LCD;

a second means for causing an input to be sensed by the pixel cell of the LCD, wherein the first and second means are fabricated on the same substrate;

a third means for sensing a photo input, the third means coupled with the second means; and a first set of source control lines and a first set of gate control lines coupled to the first means and a second set of source control lines and a second set of gate control lines coupled to the second means.

25. The LCD of claim 24, wherein the second means is coupled to a photo sensing means.

26. The LCD of claim 24, wherein the first and second means are fabricated on the same side of the same substrate.

27. The LCD of claim 24, wherein the second means causes an input from a writing device to be sensed by the LCD.

28. The LCD of claim 24, wherein the second means causes an image input to be sensed by the LCD.

29. A liquid crystal display (LCD) coupled to a processing means, wherein the LCD comprises:

a means for displaying data and video images;

a means for sensing a contact with a screen of the LCD;

a means for sensing an image received through the screen coupled to the means for sensing a contact, the means for sensing an image performing while the means for displaying performs; and a first set of source control lines and a first set of gate control lines coupled to the first means and a second set of source control lines and a second set of gate control lines coupled to the second means.

30. The LCD of claim 29, wherein the means for sensing an image comprises a photo sensing means fabricated on a same substrate with the means for displaying data and video images and the means for sensing contact with a screen.

31. A video conferencing system comprising a liquid crystal display coupled to a processor, the display:

displaying data and video images on a screen of the display using a first transistor in each of at least one pixel cell of a pixel cell array of the display, wherein the first transistor is coupled to a transparent electrode, wherein a first set of source control lines and a first set of gate control lines are coupled to the first transistor;

sensing an image received through the screen using a second transistor in each of the at least one pixel cell, wherein the second transistor is coupled to a micro lens and a photo diode, wherein a second set of source control lines and a second set of gate control lines are coupled to the second transistor, sensing an image performed while displaying data and video images is performed; and sensing an input from a contact with the screen using the second transistor.

* * * * *

UNITED STATES PATENT AND TRADEMARK OFFICE
CERTIFICATE OF CORRECTION

PATENT NO. : 6,028,581
DATED : February 22, 2000
INVENTOR(S) : Shinjiro Umeya

It is certified that error appears in the above-identified patent and that said Letters Patent is hereby corrected as shown below:

In column 5 at line 67 delete "comers" and insert --corners--

Signed and Sealed this

Third Day of April, 2001

Attest:

NICHOLAS P. GODICI

*Attesting Officer*     Acting Director of the United States Patent and Trademark Office